No. 864,768. PATENTED SEPT. 3, 1907.
F. BLOOMINGDALE.
DUMPING WAGON.
APPLICATION FILED JULY 5, 1906.

Witnesses
Lottie Prior
Lasuel C. Damarell

Inventor
Frank Bloomingdale,
by Ward & Cameron,
Attys.

UNITED STATES PATENT OFFICE.

FRANK BLOOMINGDALE, OF VOORHEESVILLE, NEW YORK.

DUMPING-WAGON.

No. 864,768.　　　　　Specification of Letters Patent.　　　　Patented Sept. 3, 1907.

Application filed July 5, 1906. Serial No. 324,730.

*To all whom it may concern:*

Be it known that I, FRANK BLOOMINGDALE, a citizen of the United States, residing at Voorheesville, in the county of Albany and State of New York, have invented certain new and useful Improvements in Dumping Wagons or Carts, of which the following is a specification.

Figure 1:
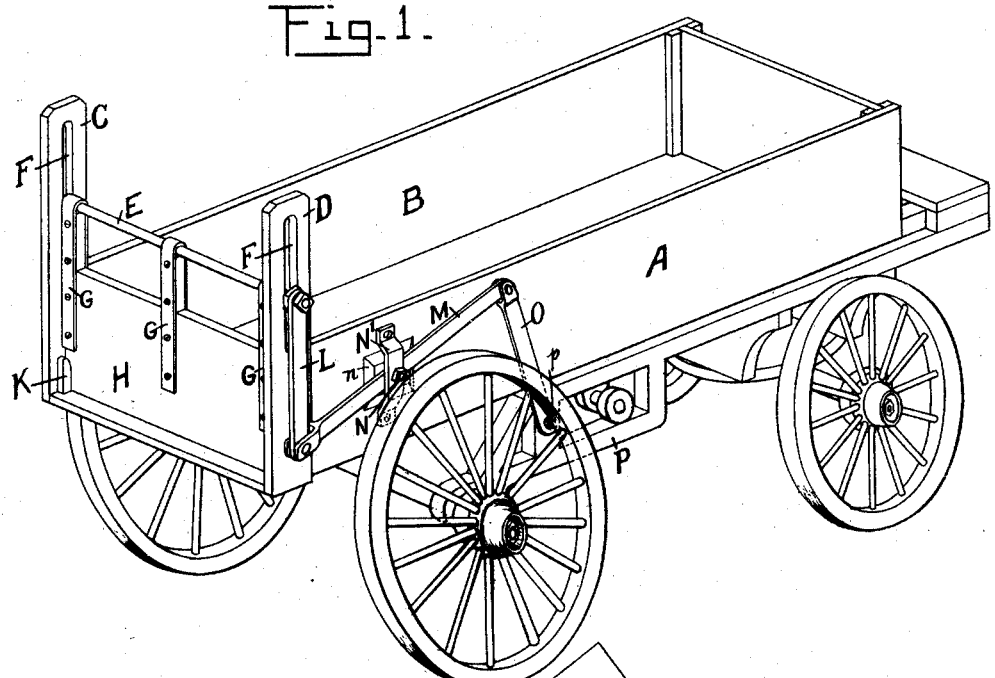
Figure 2:
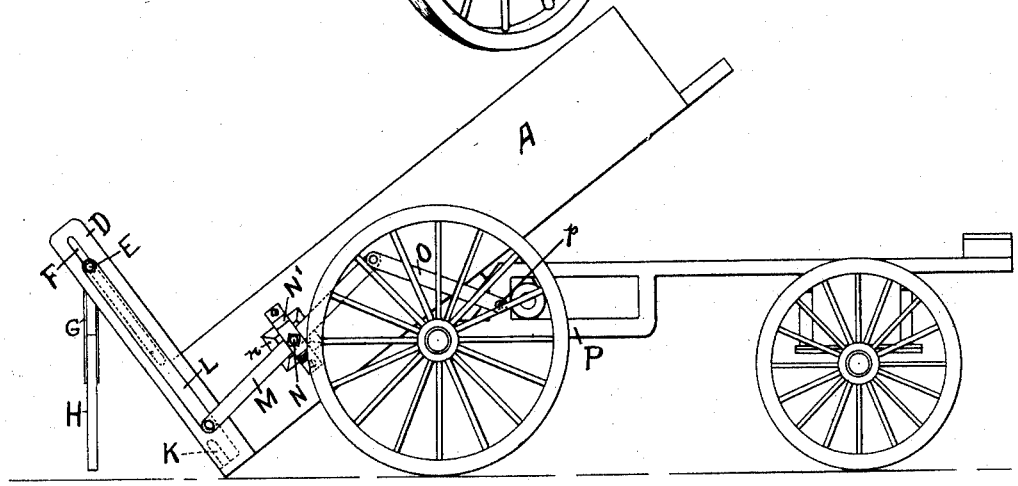

My invention relates to improvements in dumping wagons or carts, and the object of my invention is to provide an automatically operated tail-board for dumping wagon or cart, together with such elements and combinations as are hereinafter more particularly described and claimed. I attain these objects by means of the mechanism illustrated in the accompanying drawings, in which:

Figure 1 is a perspective view of a wagon provided with my invention. Fig. 2 is a side elevation of a wagon showing the position of the tail-board when the wagon is dumped.

Similar letters refer to similar parts throughout the several views.

For the purpose of providing for the raising of the tail-board and removing the same from obstructing the free passage of the contents of a wagon, when the wagon is to be dumped, and which will provide for the return of the tail-board automatically, and secure the same positively in position, preventing leakage, I have invented the apparatus described herein.

To the rear end of each side, A and B, of the box of a wagon or cart, I arrange and secure, in any suitable manner, the slotted posts, C and D, and extending across from one post, C, to the other post, D, I place the rod, E, the ends of which rod reciprocate within the slots, F, F, in said posts, respectively. Said rod supports the straps, G, which are attached to the tail-board, H. On each post, C and D, near the bottom thereof, and on the surface toward the longitudinal axis of the wagon I place a stop, K, so arranged that the tail-board when in position will be forward of said stops. The stops, K, prevent the tail-board from extending to the rear after a load has been placed in the wagon until the tail-board has been raised.

For the purpose of raising the tail-board I secure to each end of the rod, E, a link, L, which is attached to one end of the lever, M, which lever is fulcrumed to the side of the box, as at N. The link, O, is pivoted to the other end of the lever, M, and secured to the frame, P, of the wagon as at $p$. I have shown the fulcrum, N, in the form of a bolt passing through the box and block, $n$, attached to the side of the box, and bracket, N'. I do not, however, limit myself to any particular means for constructing a fulcrum for the lever, M.

Any device for dumping a cart or wagon may be used, and I, therefore, do not describe a means for performing this function. I have illustrated in my Patent #810,028, dated January 16th 1906, one means for performing this result, but I do not limit myself to any dumping device, nor to its application to a four wheeled vehicle, as I may employ my invention in any dumping vehicle.

When the box moves for the purpose of dumping, the link, O, having one end, $p$, secured to the frame, P, which is immovable, the lever, M, is oscillated on its fulcrum, N, and the link, L, is raised, which will of course lift the tail-board, H. When the tail-board has been raised sufficiently to pass the stops, K, gravity and the contents of the box will force the tail-board out to the rear in the position shown in Fig. 2. As the box is drawn back on to its frame the tail-board will assume its normal position, as the link, O, will raise the end of the lever to which it is attached, causing the tail-board to descend, and to be held in longitudinal position by the stops, K, as shown in Fig. 1.

It will be seen that it would be impossible to raise the tail-board until the box is moved for the purpose of dumping because the link, O, prevents the lever, M, from descending, and the link, L, securely holds the tail-board down. In the same way the stops, K, prevent the tail-board swinging upon the rod, E, and there can be no possibility of leakage or play when the tail-board has thus been secured in position.

I prefer to provide on each side of the wagon the links, levers and attachment shown on the side, A, in Fig. 1.

What I claim as my invention and desire to secure by Letters Patent is:

1. In a dumping vehicle; a frame; a dumping box thereon; slotted vertical posts on each side of said box at the end thereof; a rod adapted to reciprocate in said posts; a tail-board carried by said rod; a link connected at one end to the end of said rod; a lever mounted to the side of said vehicle one end of which is attached to said link; a link connecting the other end of said lever to the frame of the wagon.

2. In a dumping vehicle; a frame; a box; a tail-board; slotted posts at the end of said box at right angles to the bottom thereof; a lever attached to the side of said box; a rod connected with said tail-board adapted to reciprocate in said guide posts; a link connecting one end of said lever with said rod; a link connecting the other end of said lever with the frame of the vehicle; a means connected with the body of said vehicle to engage said tail-board when it is lowered for preventing leaking, substantially as described.

In testimony whereof I have affixed my signature in presence of two witnesses.

FRANK BLOOMINGDALE.

Witnesses:
LOTTIE PRIOR,
FREDERICK W. CAMERON.